United States Patent [19]
Grimsley

[11] Patent Number: 5,836,835
[45] Date of Patent: Nov. 17, 1998

[54] EXERCISE AND MEMORY GAME

[76] Inventor: Paul D. Grimsley, 1305 S. 3rd St., McAlester, Okla. 74501

[21] Appl. No.: 950,241

[22] Filed: Oct. 14, 1997

[51] Int. Cl.$^6$ ............................ A63B 67/00; G09B 19/02
[52] U.S. Cl. ............................................ 473/414; 434/191
[58] Field of Search .............................. 473/414; 434/191

[56] References Cited

U.S. PATENT DOCUMENTS

| | | | |
|---|---|---|---|
| D. 172,987 | 9/1954 | Quigley | 473/414 X |
| 3,008,718 | 11/1961 | Berliner | 473/414 X |
| 3,139,281 | 6/1964 | Nicholson | 473/414 |
| 3,515,385 | 6/1970 | Gunderson | 473/414 |
| 4,733,864 | 3/1988 | Casteel | 473/414 |
| 5,102,129 | 4/1992 | Roberts | 273/239 X |
| 5,156,409 | 10/1992 | Barnes | 473/414 X |
| 5,507,495 | 4/1996 | Kiss | 273/243 |

*Primary Examiner*—William H. Grieb
*Attorney, Agent, or Firm*—Robert K. Rhea

[57] ABSTRACT

A hopscotch like and math instruction game comprising a mat having a plurality of zones on one surface respectively containing a plurality of ramndomly selected single digit numerals permitting players to play the game within the perameters therof.

4 Claims, 1 Drawing Sheet

EXERCISE AND MEMORY GAME

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to parlor or yard games in which the game piece is portable and safe for use by adults or children and which may be rolled from a generally flat playing position to a loosely rolled cylindrical configuration for storage and transport.

2. Description of the Prior Art

U.S. Pat. No. 4,733,864 issued Mar. 29, 1988 to Casteel for parlor game discloses a game mat formed by a section of carpet which is marked or painted with selected indicia and in which the fibers on the carpet have raised and recessed portions to enable sight impaired persons to play the game within the parameters thereof.

U.S. Pat. No. 5,507,495 issued Apr. 16, 1996 to Kiss for Games For Teaching Alphabet Numbers, Colors, Shapes and Math along with Coordination and Motor Skills. This patent discloses a planar member marked with a plurality of concentric circles and diametric and radial lines and provided with indicia such as letters or numerals in the respective defined circular areas. The object of the game is for teaching alphabet numerals, colors, shapes and math along with coordination and motor skills of the players such as children.

U.S. Pat. No. 3,515,385 issued Jun. 2, 1970 to Gunderson for Modular Hopscotch Court and U.S. Pat. No. 5,102,129 issued Apr. 7, 1992 to Roberts for Game Apparatus. Each of these two patents disclose a hopscotch-type game in which the game board may be assembled in different configurations and used with a like plurality of different playing pieces.

The hopscotch-type games disclosed by above named patents are directed toward the dexterity of players in playing the game.

The instant invention provides a playing mat which teaches children to readily recognize numerals and to help develop their memory and capabilities of solving mathematical problems in response to a verbal or visual sequence of numerals presented as problems to be mentally solved or numerals to be recognized by stepping on the numerals in sequence according to the answer to the problem or numbers listed.

BRIEF SUMMARY OF THE INVENTION

A game apparatus formed by a mat, which may be a section of residential or commercial carpeting, having a base layer and a pile layer or tufts thereon. The pile of the carpeting is scored as by painting lines, of a color contrasting with the color of the carpet, to define a rectangular, preferably square, area encompassed by a circle and transversely divided to form a plurality (9) of smaller squares containing a like plurality of indicia preferably numerals from 1 through 9, painted in the respective plurality of squares. The numeral zero (0) is painted between the respective sides of the central square and the encompassing circle, including a period (.) adjacent each zero (0).

The principal objects of the invention are to provide hopscotch-type game mat for increasing the recognition of numerals by children and development of mathematical skills in stepping off the answer to addition, subtraction or multiplication problems, which by the random spacing of numerals requires dexterity in stepping on or contacting the numerals comprising an answer to a mathematical problem; and, to provide a game apparatus which may be easily and economically manufactured.

DESCRIPTION OF THE PREFERRED EMBODIMENTS

Figure 1:
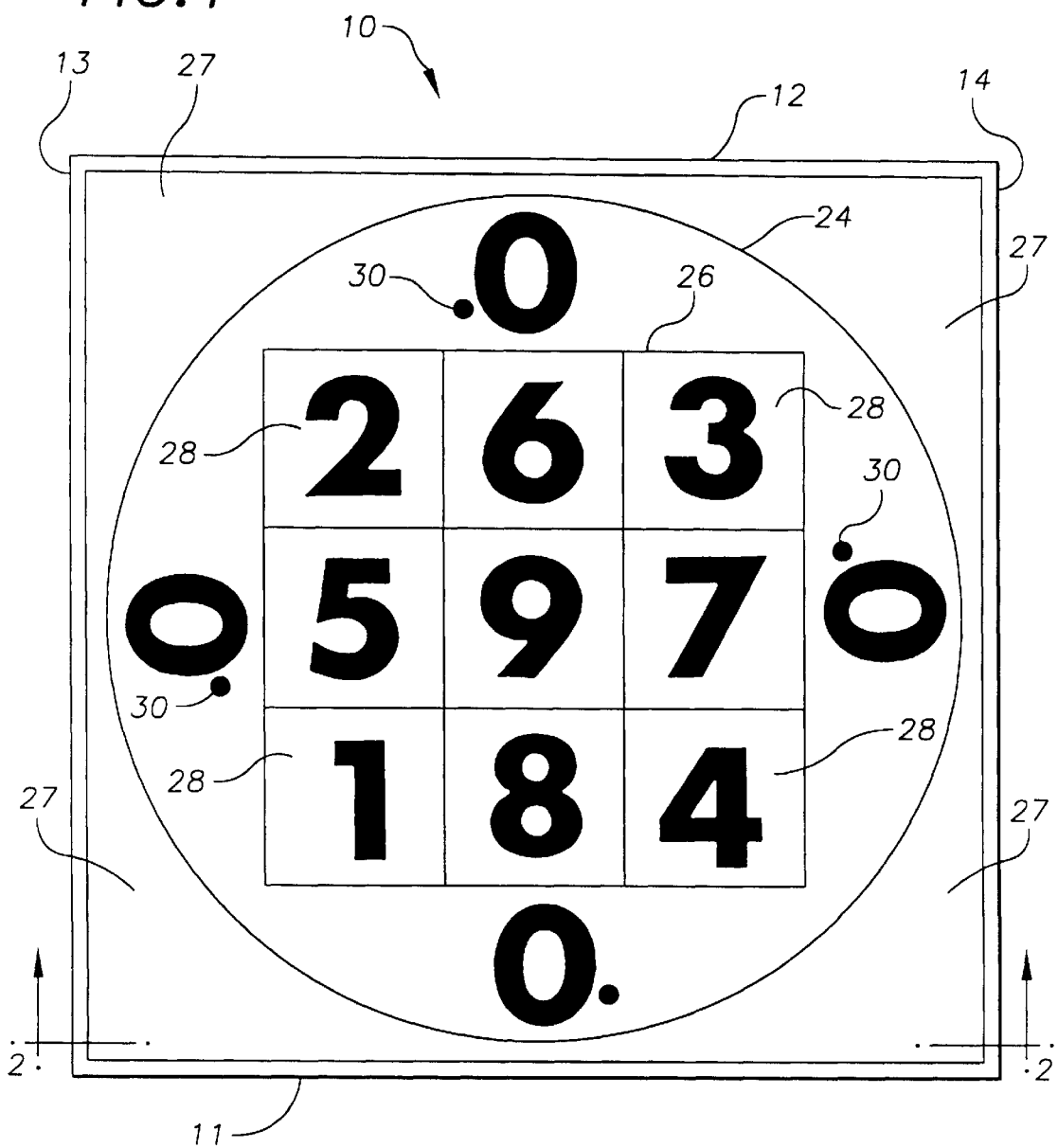
FIG. 1 is a top view of the game mat.
Figure 2:
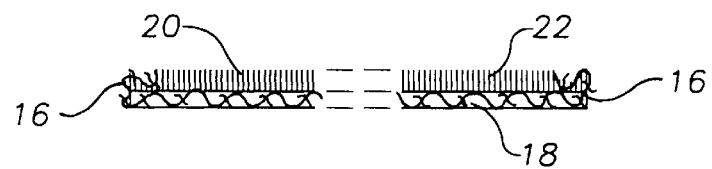
FIG. 2 is a fragmentary vertical cross sectional view, to an enlarged scale, taken substantially along the line 2—2 of FIG. 1.

Like characters of reference designate like parts in those figures of the drawings in which they occur.

In the drawings:

The reference numeral 10 indicates a parlor game formed by a polygonal outline section of carpet, preferably square, defined by opposing parallel edges 11–12 and 13–14. The peripheral edges of the carpet are fabric bound, as at 16, to provide a finished appearance and extend the life of the carpet. The carpet is of conventional construction having a warp and weft woven base layer 18 and an overlying layer formed by tufts 20 bonded to the base layer. The upper limit of the tuft layer 20 forms a substantially planar surface 22.

The upper surface 22 is scored or painted to define a circle 24 a color contrasting with the color of the carpet. The circle 24 circumscribes a square 26, in the example shown, similarly scored or painted and defining a plurality (4) of outer zones 27 within the circle and adjacent respective sides of the square 26.

The square 26 is divided by a plurality (4) of orthogonal dividing lines forming a plurality (9) of equal area adjacent zones 28. Randomly selected numerical digits, 1 through 9, are similarly scored or painted in the respective zones 28. The digit zero (0) is similarly scored or painted in the outer zones 27. Additionally, a decimal point 30 is placed adjacent the respective zero.

OPERATION

The planar member 10 is placed on any flat supporting surface such as a floor, not shown. Any number of players may play the game, however, only one player at a time is positioned on the planar member 10. When a selected player is standing on the planar member, for example, in one of the corner portions outwardly of the circle 24, an instructor or another player gives the selected player a mathematical problem, either verbally or visually as by the problem printed on a card, not shown, given to or selected by the player who then steps on zones containing the numerical digits equivalent to the answer, in his opinion, to the problem.

Similarly in recognizing and identifying numerals a player listening to an audio tape reciting a randomly arranged series of numerals, the player attempts to step on the several numerals in the sequence presented.

Obviously the invention is susceptible to changes or alterations without defeating its practicability. Therefore, I do not wish to be confined to the preferred embodiment shown in the drawing(s) and described herein.

I claim:

1. A combination math teaching and exercising game, comprising:

a planar member having a circle adjacent its perimeter circumscribing a rectangle subdivided to form a plurality of juxtaposed equal area rectangular zones and forming an outer zone, within the circle, adjacent respective sides of the rectangle; and, a like plurality of single digit numerals in the respective zones whereby, a player when standing adjacent the circle and given a mathmatical problem to solve steps on the zone or zones in the order indicating the answer.

2. The combination according to claim 1 in which the digits in the juxtaposed zones are randomly selected; and, the digits in the respective outer zones is a zero.

3. The combination according to claim 2 in which the base member is a section of carpet having a base layer and an overlying tufted pile layer.

4. The combination according to claim 3 in which the color of the single digit numerals contrasts with the color of the tufted pile.

\* \* \* \* \*